United States Patent [19]
Manion et al.

[11] Patent Number: 5,909,991
[45] Date of Patent: Jun. 8, 1999

[54] SELF ADJUSTING PLUG

[75] Inventors: Michael P. Manion; Donald M. Brown, both of Los Angeles, Calif.

[73] Assignee: Arrow Sign Company, Los Angeles, Calif.

[21] Appl. No.: 08/977,462

[22] Filed: Nov. 24, 1997

[51] Int. Cl.⁶ .............................. A47G 3/00; F16B 19/00
[52] U.S. Cl. ........................... 411/377; 411/510; 411/913
[58] Field of Search ........................... 411/508–510, 373, 411/377, 913; 16/2.3

[56] References Cited

U.S. PATENT DOCUMENTS

| | | | |
|---|---|---|---|
| 4,454,699 | 6/1984 | Strobl | 411/510 |
| 4,718,210 | 1/1988 | McCourt | 411/508 |
| 5,195,859 | 3/1993 | Thornton | 411/510 |
| 5,232,322 | 8/1993 | Regensburger | 411/510 |
| 5,308,205 | 5/1994 | Lautenschlager | 411/510 |

FOREIGN PATENT DOCUMENTS 344549  3/1960  Switzerland ........................... 411/510

Primary Examiner—Flemming Saether
Attorney, Agent, or Firm—Henricks, Slavin & Holmes LLP

[57] ABSTRACT

A self adjusting plug is provided that is adapted to be removeably held in place within openings of different sizes in order to plug such openings is provided. The self adjusting plug comprises a top portion having a first and second side, a shaft portion, having a first and second end, the first end of the shaft portion being connected to the first side of the top portion, and one or more projections attached to the shaft portion and extending outwardly from the shaft portion. The self adjusting plug is used to plug openings by passing the bottom end of the plug into the first end of the opening, forcing the projections of the bottom end of the plug to flex as they contact the wall of the opening, to create a friction fit between the projections of the plug and the walls defining the opening.

8 Claims, 1 Drawing Sheet

SELF ADJUSTING PLUG

FIELD OF THE INVENTION

This invention relates in general to self adjusting plugs and more particularly to a self adjusting plug that is adapted to be removeably held in place within openings of different sizes in order to plug such openings.

BACKGROUND OF THE INVENTION

There are many known devices which include openings. Often the openings are necessary only for certain operations of the device. In other instances, the openings are unnecessary, and thus for optimal operation of the device. These openings must be plugged to prevent the internal components or areas from being exposed to the elements. Such openings therefore require plugs that can be removeably placed within the opening in order to adequately plug the opening. One problem associated with such devices occurs where there are numerous devices and the openings of those devices are not uniform in dimension. In such cases, it is costly to maintain an inventory of numerous plugs of various dimensions in order to plug all of the openings and to determine for each particular opening which size plug is needed.

One example of a device which includes such an opening is a manhole cover. Manhole covers are generally circular in shape and are adapted to cover manholes. Manholes permit workers to enter the sewage system to perform any necessary repairs and maintenance. Because manholes are generally formed from steel, they can be quite heavy and thus be difficult to remove from the manhole. Further, manhole covers usually do not include handles, which would facilitate in their removal, because most manhole covers must be flat, as they are often located in streets or on sidewalks. Thus, in order to remove the manhole cover from the manhole, tools have been developed which permit the user to more easily lift the manhole cover from the manhole. These tools, however, require that a small opening be made in the manhole cover.

While the openings in the manhole covers are necessary to permit the user to lift the manhole cover from the manhole, the opening causes the drawback that, during periods of rain, water is permitted to enter into the sewage system through these openings. Because many sewage systems are not designed to handle large flows of water, any additional water entering into the sewage system may cause severe problems in the sewage systems. During periods of rain, the amount of water flowing through the system increases, and if the rain is heavy enough, the excess water flowing through the system may cause overflows in the system, thereby causing untreated sewage to flow from the sewage system and into natural waterways, such as lakes, rivers, and oceans. Thus, it is important, in order to prevent the overflow of raw, untreated sewage, and thereby protect the public health, that, during periods of rain, the amount of water flowing through the sewage systems be limited as much as possible.

Although the water flowing through the opening of one manhole during a period of rain may be insignificant when compared to the total amount of water flowing through the sewage system, when the total number of manholes in the entire sewage system is considered, the amount of water added to the system during periods of rain can be substantial. For instance, in the county sewer system of Los Angeles, there are 140,000 manhole covers which amounts to approximately 1,500 square feet of openings. The water flowing through these openings during periods of rain is not insubstantial. This amount of water may be enough to overflow the sewage system or at least further exacerbate the problem. Thus, it is vitally important that the openings in the manhole covers be plugged when not being used to remove the manhole covers, so that water does not enter the sewage system through these openings during periods of rain.

Covering all of the openings in the manhole covers can be very difficult, however. In any one area, the manhole covers in use may have openings of different sizes. This would require that plugs of different sizes and shapes be carried by the user, and the proper plug be found for each particular manhole cover. This would increase the amount of time it would take to plug the openings, thereby increasing the labor cost for plugging the openings. It would also increase the inventory of plugs that would have to be maintained, thereby increasing the cost of inventory.

One proposed solution to the problem of using a single plug that can plug openings of differing sizes in manhole covers is a screw with a deformable rubber portion that is compressed and widened to fill the opening. The device has a base and a top portion that are attached to each end of the screw. The plug is placed into the opening and the base is tightened by screwing it onto the shaft of the screw, thereby decreasing the distance between the top of the screw and the base. The rubber portion, which is located between the top and base portion, is compressed when the base portion is screwed further onto the shaft of the screw. As the rubber portion compresses, it expands outwardly to fill the opening, until it reaches the side walls of the opening. The base is tightened until the rubber portion is firmly pressed against the walls of the opening, thereby plugging the opening. Because the rubber portion must be compressed to fill the opening, this plug may be used to plug any opening having a diameter that is between the diameter of the rubber portion in its relaxed state and in its compressed state.

This plug having a deformable rubber portion, although adequate for its intended use, has many drawbacks. For example, such plugs are hard to use and require a considerable amount of time to be properly placed within the opening and to be removed from the opening. Further, these plugs are subject to degradation due to the elements, because the rubber may degrade and the base, top, and screw portions may rust. Moreover, such plugs are difficult and expensive to manufacture.

Accordingly, it will be appreciated from the foregoing that there is a definite need for a self adjusting plug. The plug should be capable of easily and quickly plugging an opening with a substantially water tight plug. The plug should be adapted to fit in a variety of differently sized openings. It should also be easily removed from the opening and replaced into the same or another opening. It should not be subject to degradation by the elements and it should be lightweight and inexpensive to manufacture. The present invention meets these needs.

SUMMARY OF THE INVENTION

These needs are met by the apparatus and methods of the present invention which can easily and quickly plug openings of different dimensions. In accordance with broad, functional aspects of the present invention, a self adjusting plug is provided which is adapted to fit into and plug openings of different dimensions, which is easily removed from the opening and replaced into the same or another opening, which is not subject to degradation, and which is lightweight and inexpensive to manufacture.

In accordance with the present invention, the self adjusting plug comprises a top portion having a first and second side, a shaft portion having a first and second end, the first end of the shaft portion being connected to the first side of the top portion, and at least one projection that is attached to the shaft and extends outwardly from the shaft. The plug is adapted to pass into and plug an opening, wherein the opening is generally located on an item such that the opening has a depth through the item and is defined by a wall. Thus, the opening has a first end and a second end and has a first side adjacent to its first end and a second side adjacent to its second end. When the plug of the present invention is used to plug an opening, the top portion of the plug will sit on the first side adjacent to the first end of the opening, and the shaft and at least one projection will be within the opening. The projection will contact the walls of the opening and provide a friction fit within the opening. Preferably, but not necessarily, a plurality of projections may be provided.

The plug of the present invention provides the valuable benefit over the prior art that it can be easily and quickly used to plug openings of different sizes. One reason for this benefit is that the plug of the present invention is formed entirely of one piece of plastic. The plastic allows the projection (or projections) to be flexed when the plug is inserted into the opening. Although the invention is described herein as being formed from plastic, the invention is not limited to any particular type of plastic or to plastic in general as the material for the plug. Any suitable material capable of forming a plug having flexible projections, as is known to those of ordinary skill in the art, may be used and is within the scope of the present invention. The use of plastic provides the additional advantage over the prior art in that the plug of the present invention can be manufactured very quickly, easily, and inexpensively, because the plug can be formed using an injection molding process. Plastic also provides the advantage of being lightweight and having the ability to withstand the elements without any significant degradation.

The plugs of the present invention can be used to plug any opening having a first end with a size that is less than the size of the top portion. The plug is used to plug such openings by passing the shaft of the plug into the first end opening. As the shaft passes into the opening, the projection (or projections), which extend outwardly from the shaft, contact the walls of the opening and, because the width of the projections taken from the end tip of one projection to the end tip of another projection is greater than the width of the opening, the projections will flex as they are passed into the opening. This ability of the projections to flex against the wall of the opening as the plug is passed into the opening is a feature of the present invention which permits the plug to plug openings of different dimensions and holds the plug in place within the opening with a friction fit.

The fact that the projections are flexible and have a width from one end tip to another that is greater than the width of the opening not only provides the benefit of holding the plug in place within the opening, but also allows it to be removed from the opening when an adequate force is applied to the plug. In another embodiment of the present invention, the projections are passed through the opening far enough so that the projection will pass through and out the second end of the opening. Because the width of the projections taken from the end tip of one projection to the end tip of another projection is greater than the width of the second end of the opening, then the projections will be adjacent to the second side of the opening, and will make it more difficult for the plug to be removed back through the opening.

The plug of the present invention may be used to plug openings of nearly any size and shape. As one of ordinary skill in the art will appreciate, the configuration of each of these elements will depend on the size and shape of the opening that the user wants to plug. For example, in the case of the openings on a manhole cover, the openings are generally circular in shape and have a depth of between one and two inches and a diameter of between three quarters of an inch and an inch. The circular top portion should be sized so that it will sufficiently cover the entire surface of the opening when the plug is in place within the opening. Thus, in the example of the manhole cover, a self adjusting plug in accordance with the present invention should have a circular top portion with a diameter greater than approximately one inch. The plug may have a shaft that is greater in length than the depth of the opening and should have at least one projection which extends from the shaft at a distance along the shaft that is also greater than the depth of the opening.

The plug of the present invention is easily placed within the opening to be plugged. The shaft of the plug is first placed generally within the first end of the opening. In one embodiment of the present invention, there is a plurality of sets of projections, with the projections within each set of projections being of equal length, but the set of projections closest to the end of the shaft being shorter in length than the projections of the other set or sets. In other words, the projections are shorter at the end of the shaft than they are further up the shaft. The shorter projections at the end of the shaft permit the end of the shaft to be easily guided and aligned into the opening without any trial and error. Thus, the plug is placed within the opening with the short projections at the end of the shaft guiding and aligning the shaft into the opening. The user then simply has to apply sufficient force to the top portion of the plug to cause the shaft of the plug to move into the opening far enough for the top portion to sit on top of the first end of the opening. Such force also causes the projections to flex as they contact the wall of the opening, thereby providing a friction fit with the walls of the opening. The force can be applied by the hand of the user, by a tool such as a hammer, or even by the foot of the user.

When it is no longer desired that the opening be plugged, the plug can be removed by applying an upward force to the top portion of the plug with, for example, a screwdriver or other leveraging device. Sufficient force has to be applied to cause the projections extending outwardly from the shaft to pass back through the opening against the friction fit. In another embodiment, sufficient force has to be applied to cause the projections to pass back through the second end of the opening and flex against the wall of the opening, in opposite fashion from when the plug was placed into the opening. Thus, the plug is easily removed from the opening, without causing any damage to the plug or to the opening. The plug can then be easily replaced into the opening by repeating the steps set forth above.

Other objects, features, and advantages of the present invention will become apparent to those skilled in the art from a consideration of the following detailed description taken in conjunction with the accompanying drawings which illustrate, by way of example, the principles of the present invention.

DETAILED DESCRIPTION OF THE PREFERRED EMBODIMENTS

The following description is provided to enable any person skilled in the art to make and use the present invention and sets forth the best modes contemplated by the inventors for carrying out their invention. As those skilled in the art will appreciate, there are modifications, adaptations, and alternatives within the scope and teaching of the present invention that will be readily apparent from the generic principles of the invention that have been specifically defined. The scope of the invention is defined solely by the appended claims.

Figure 1:
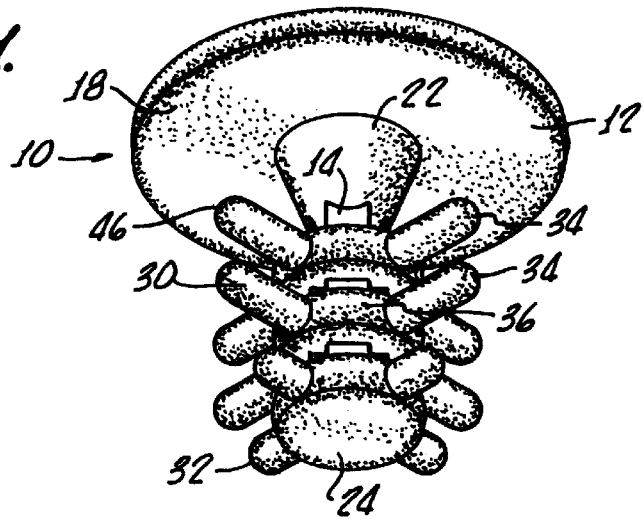
FIG. 1 is a bottom perspective view of a self-adjusting plug in accordance with one embodiment of the present invention.
Figure 2:
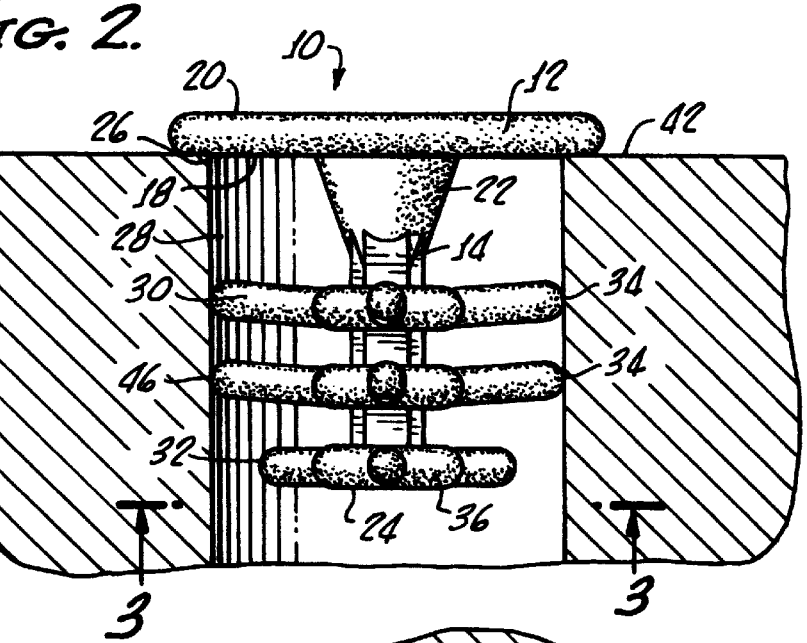
FIG. 2 is a side elevational view showing the self adjusting plug of FIG. 1 within an opening.
Figure 3:
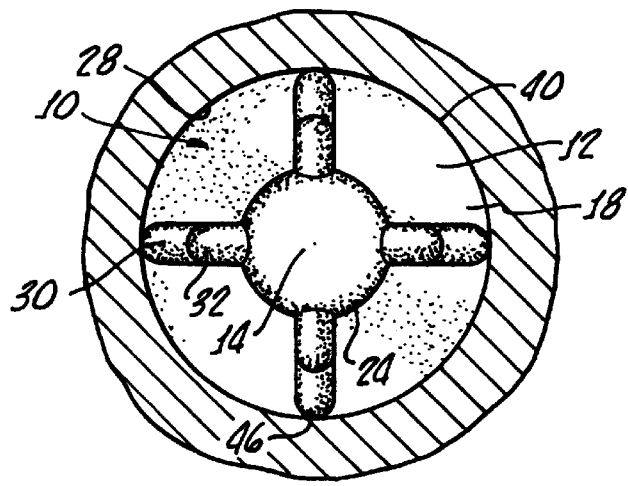
FIG. 3 is a bottom view along the lines 3—3 of FIG. 2 showing the self adjusting plug of FIG. 1 within an opening.

One embodiment of the present invention is the self adjusting plug 10 shown in FIGS. 1–3. The exemplary self adjusting plug 10 has a top portion 12, a shaft portion 14, and a plurality of projections 30 attached to the shaft portion 14 and extending outwardly from the shaft portion 14. The top portion 12 has a first side 18 and a second side 20. The shaft portion 14 has a first end 22 and a second end 24 and, the first end 22 of the shaft portion 14 is attached to the first side 18 of the top portion 12. In the illustrated embodiment of the present invention, the shaft portion 14 has a constant diameter, except that the width of the first end 22 of the shaft portion increases in a conical shape towards the attachment with the first side 18 of the top portion 12, as shown in FIGS. 1 and 2. This increased diameter of the shaft portion 14 at its attachment to the top portion 12 provides additional strength and stability to the plug 10 in this area, so as to prevent the top portion 12 from becoming separated from the first end 22 of the shaft portion 14 during use. In the illustrated embodiment, the shaft portion 14 has an X-shaped cross-section, as is shown in FIGS. 1 and 2. The X-shaped cross-section of the shaft portion provides the benefits of both a reduction in the amount material used in forming the shaft portion 14 and the benefit of providing additional strength to the shaft portion 14, much like the channels in a channel steel beam provide additional strength to the beam. The present invention is not limited to an X-shaped shaft portion 14 with a conically shaped first end 22, but may also include, for example, a shaft portion 14 having a circular, square, triangle, or any other shaped cross-section or other shaped first end.

The top portion 12 of the present invention may be of any shape so that it will cover the entire first end 26 of the opening 28 to be plugged. This is because the top portion 12 is intended to cover the first end 26 of the opening 28, which in most cases is exposed to the elements, or outside area, where material is to be kept from entering the opening 28. Thus, in order to prevent such material from entering the opening 28 or to protect the opening 28 from the outside, the top portion 12 should be large enough to cover the first end 26 of the opening 28. For instance, if the opening 28 to be plugged is circular with a diameter of one inch, then the top portion 12 should also be circular and have a diameter that is greater than one inch. Although a circular top portion 12 is shown in FIGS. 1 and 2, it is not intended that the scope of the invention be limited to circular-shaped top portions 12 or that the openings 28 be limited to circular openings. The top portion 12 of the plug 10 should be thick enough to have sufficient strength to withstand the conditions in which the plug is intended to operate. For example, in the case of a manhole cover, the top portion 12 may have to withstand cars, trucks and buses passing over the plug 10. In other applications within the scope of the present invention, the plug 10 may not have to withstand such conditions, and the top portion 12 may be thinner, if savings of material is an important consideration. In any event the top portion 12 should be thick enough to attach to and support the first end 22 of the shaft portion 14 and withstand the force necessary to press the plug 10 into the opening 28.

As discussed above, and as shown in FIGS. 1–3, the exemplary embodiment includes a plurality of projections 30 attached to the shaft portion 14 and extending outwardly from the shaft portion 14. Although the projections 30 are shown in the drawings as being twelve cylindrically shaped projections, it is not intended that the present invention be limited to such cylindrically shaped projections, nor is it intended to be limited to twelve projections, or limited to projections that form a 90° angle with the shaft portion or a 90° angle with each of the other projections within the same plane, or that there even be more than one projection. For example, it is within the scope of the present invention to have projections 30 of different shapes, in different planes, at angles other than 90° from the shaft portion 14 or from the other projections 30, or even only one projection, such as a single disk, so long as the projection or projections provide the features as described herein. A plurality of longitudinally spaced disks may be provided in place of, or in addition to, projections 30. For instance, there may only be one set of projections 30, which extend outwardly from the shaft portion 14 within a single plane. There may also be at least two sets of projections 30, each set of the projections comprising at least one projection, and each projection within each of the sets of projections extending outwardly from the shaft portion within a single plane. Further, each projection 30 may form a 90° angle with the shaft portion and each set of projections may comprise four projections, with each projection forming a 90° angle with the projection adjacent to it.

In the illustrative embodiment shown in FIGS. 1–3, there are three sets of four projections 30 each. Within each set of projections 30, the projections have a 90° angle with the shaft portion 14 and a 90° angle with the projections 30 adjacent to it within its sets. Further, each of the projections 30 within a set is equal in length, however, the set of projections 32 closest to the second end 24 of the shaft portion 14 is shorter in length than the projections 34 of the other two sets, for the reasons described above. Further, the shaft portion 14 has at least one annular ring 36 attached to and surrounding the shaft portion 14. The projections 30 are attached to the annular ring 36 and extend outwardly from the annular ring 36. The annular rings 36 provide increased strength and stability to the shaft portion 14 and to the projections 30 that are attached to the annular rings 36.

As an alternative, the plug 10 may have at least two sets of projections 30, each set of projections having a plurality of projections. One of the sets of projections 30 is attached to the shaft portion 14 close to or at its second end 24. Each of the projections 30 within the sets have the same length, but the projections in the set of projections 32 located closest to the second end 24 of the shaft portion 14 is shorter than the projections 34 in the other set or sets of projections. The fact that the projections 32 closest to the second end 24 of the shaft portion 14 provides the benefit of allowing the user to more easily guide the plug 10 into the opening. Because these projections 32 are shorter than the other projections 34, it will be easier to locate the center of the opening 28 and place the shaft portion 14 and projections 32 and 34 into the center of the opening. With larger projections, the user may have to be more accurate through trial and error to place the projections 32 and 34 within the opening.

The plug 10 of the present invention is used to plug openings 28 of the type shown generally in FIGS. 2–3. These openings 28 are usually found in devices, such as manhole covers, but may be any opening having the characteristics that would permitting plugging by the apparatus and method of the present invention, such as on boats, on rooftops, in furniture, or the like. Such openings 28 have a first end 26 and a second end (not shown in the drawings) which are separated from each other by wall 40. The openings 28 also have a first side 42 adjacent to the first end 26 of the opening 28 and a second side (not shown in the drawings) adjacent to the second end (not shown in the drawings) of the opening 28. The scope of the present invention is not limited to the any particular device or specific opening, rather it is intended that the scope of the present invention include openings of any type in any device or article of manufacture that can be plugged by the apparatus or method of the present invention.

The plug 10 provides the benefit over known plugs in that it can fit and plug openings 28 of different sizes and dimensions. This benefit is derived from both the configuration of the plug 10 and from the material from which the plug 10 is formed. The configuration of the plug 10 and the material permit the projections 30 of the plug 10 to flex as they pass through and contact the walls 40 of the opening 28. Because the projections 30 contact the wall 40 of the opening 28 and flex, the end tips of the projections 30 form a friction fit with the walls 40 of the opening 28, which holds the plug 10 in place within the opening 28. Thus, the plug 10 can fit within any opening 28 having walls 40 that permit the projections 30 to flex as the plug is passed through the opening 28.

The plug 10 of the present invention may be formed from a plastic material and may comprise only one piece. Any type of plastic or other material that provides the feature of flexible projections 30 may be used within the scope of the present invention, as is known to those of ordinary skill in the art. It is also within the scope of the invention for the plug 10 to be formed from more than one piece, as is also well known to those of ordinary skill in the art. The use of plastic for the plug 10 provides the benefit of an inexpensive, lightweight material that does not degrade substantially when exposed to the elements. It is important to the present invention that the material forming the plug 10 not degrade, because during use, it is expected that the plug may be subject to sun, rain, snow, ice, and, in the case of manhole covers, may be subject to cars, trucks and buses running over the plug 10.

If the plug 10 is to be formed from plastic, it may be formed by injection molding. Injection molding provides the advantage of a simple, quick, inexpensive, and efficient process for forming the plug 10 of the present invention. If injection molded, the plug 10 can be formed from Chevron High Density Polyethylene (HDPE), which Chevron has given the identity of HiD 9018 injection molding resin.

The novel plug 10 of the present invention is used to plug an opening 28 as follows. The user first places the second end 24 shaft portion 14 of the plug into the center of the opening 28. As discussed above, in one embodiment of the present invention, the projections 32 located at the second end 24 of the shaft portion 14 are shorter than the other projections 34 located further up the shaft portion 14. These shorter projections 32 provide the benefit that the user may more easily locate the center of the first end 26 of the opening 28 and place the second end 24 of the shaft portion 14 within the center of the first end 26 of the opening 28. Once the second end 24 of the shaft portion 14 is within the center of the first end 26 of the opening 28, the user then pushes down on the top portion 12 of the plug 10 to cause the shaft portion 14 and the projections 30 to pass through the opening 28. The user may push down upon the top portion 12 of the plug 10 by using either the palm of his hand, the bottom of his foot, or even a tool, such as a hammer.

As the shaft portion 14 passes through the opening, the end tips 46 of the projections contact and rub against the wall 40 of the opening 28, as shown in FIG. 2. It has been found by the inventor that the end tips 46 of the projections 30 may either be rounded (as shown), beveled, squared off, etc. In any configuration, the plug works as intended. As the end tips 46 of the projections 30 rub against the wall 40 of the opening 28, the projections 30 flex to permit the shaft portion 14 to pass through the opening 28, without the projections 30 breaking. Once in place within the opening 28, the plug 10 is held there by the friction fit of the projections with the wall of the opening 30, as shown in FIG. 2. Alternatively, where the plug is substantially longer than the opening, the projections 30 can extend beyond the second end (not shown in the drawings) of the opening and are adjacent to the second side (not shown in the drawings) of the opening 28. Thus, in this embodiment, the plug 10 cannot be pulled out of the opening 28 unless the projections 30 were to also be pulled back against the second side 44 of the opening, through the second end of the opening, and against the wall 40 of the opening 28.

In either case, the projections 30 therefore hold the plug 10 in place when subjected to wind, rain, cars, etc., but permit the user to remove the plug 10 from the opening 28, when desired, if the proper force is exerted on the plug 10 to pull it back through the opening 28. The force can be applied by the user with a leveraging tool, such as a screwdriver. In this example, the end of the screwdriver is placed underneath the top portion 12 of the plug 10. The user then exerts an upward force on the top portion 12 of the plug 10 with the end of the screwdriver in order to pull or force the projections 30 of the plug into the opening 28 through the second end 38 of the opening 28 until the projections 30 are pulled back through the opening 28 and out the first end 26 of the opening 28. Once removed from the opening 28, the plug 10 should be in such a condition that it can be replaced into the opening 28 from which it came, or it may be placed in another opening 28 of the same or similar size.

While a particular form of the invention has been illustrated and described, it will be apparent that various modifications can be made without departing from the scope of the invention. By way of example, but not limitation, the plug of the present invention can be formed of other materials, such as rubber or metal, that provide the characteristic qualities of the plug as described herein. Further, the plug of the present invention may be shaped with a top portion and with projections of varying size and shape in order to plug openings of various shapes other than circular, such as triangles, squares, or even abstract shapes. Accordingly, it is not intended that the invention be limited by the specific embodiment disclosed in the drawings and described in detail hereinabove.

We claim:

1. A plug, comprising:

a top member having a first side and a second side;

a shaft having a first end and a second end, the first end of the shaft being connected to the first side of the top member;

at least a first ring on the shaft and extending outwardly from the shaft; and a plurality of projections attached to the first ring and extending outwardly from the first ring, the projections being spaced from one another such that adjacent projections do not abut one another.

2. A plug as claimed in claim 1, further comprising:

a second ring on the shaft and extending outwardly from the shaft, the second ring being in spaced relation to the first ring; and a plurality of projections attached to the second ring and extending outwardly from the second ring, the projections being spaced from one another such that adjacent projections do not abut one another.

3. A plug as claimed in claim 2, wherein the projections on the first ring are longer than the projections on the second ring.

4. A plug as claimed in claim 3, wherein the second ring is closer to the second end of the shaft than the first ring.

5. A plug as claimed in claim 1, wherein the ring defines a perimeter and the spacing between the projections is such that the majority of the perimeter is free of projections.

6. A plug as claimed in claim 1, wherein all of the projections are located in a single plane.

7. A plug as claimed in claim 1, wherein the projections define respective first and second longitudinal ends, the first end longitudinal being attached to the ring and the second longitudinal end defining a curved end surface.

8. A plug as claimed in claim 7, wherein the curved end surface comprises a hemispherical surface.

* * * * *